United States Patent
Li et al.

(10) Patent No.: US 8,411,371 B2
(45) Date of Patent: Apr. 2, 2013

(54) COMPACT ZOOM LENS

(75) Inventors: Jun-Jie Li, Guangdong (CN); Zi-Yuan Li, Guangdong (CN); Long-Liang Zou, Guangdong (CN); Xiao-Tian Kang, Guangdong (CN); Jian-Jun Zhang, Guangdong (CN)

(73) Assignees: Premier Image Technology(China) Ltd., Foshan (CN); Hon Hai Precision Industry Co., Ltd., New Taipei (TW)

( * ) Notice: Subject to any disclaimer, the term of this patent is extended or adjusted under 35 U.S.C. 154(b) by 191 days.

(21) Appl. No.: 13/048,878

(22) Filed: Mar. 16, 2011

(65) Prior Publication Data

US 2012/0140338 A1 Jun. 7, 2012

(30) Foreign Application Priority Data

Dec. 2, 2010 (CN) .......................... 2010 1 0571643

(51) Int. Cl.
*G02B 7/10* (2006.01)
*H04N 5/225* (2006.01)
*G03B 17/00* (2006.01)

(52) U.S. Cl. .......................... 359/700; 359/699; 348/376
(58) Field of Classification Search .......... 359/696–698, 359/700, 703–704, 808–809, 811, 818–819, 359/822–826, 813–814; 396/529, 532, 535, 396/542; 348/208.99, 294, 335, 340, 373–374, 348/396
See application file for complete search history.

(56) References Cited

U.S. PATENT DOCUMENTS

| 2004/0207931 A1* | 10/2004 | Lee ................................ 359/704 |
| 2008/0180812 A1* | 7/2008 | Honsho et al. ................. 359/700 |
| 2010/0165481 A1 | 7/2010 | Zou et al. |

FOREIGN PATENT DOCUMENTS

CN 101770062 A 7/2010

\* cited by examiner

*Primary Examiner* — Dawayne A Pinkney
(74) *Attorney, Agent, or Firm* — Altis Law Group, Inc.

(57) ABSTRACT

A zoom lens includes a first lens, a first lens barrel, a shutter assembly, and a guide barrel. The first lens barrel houses the first lens. The shutter assembly is positioned on a distal end of the first lens barrel toward an object side of the zoom lens. The guide barrel is received in the first lens barrel and configured for guiding the first lens barrel to move along the optical axis of the zoom lens.

10 Claims, 6 Drawing Sheets

COMPACT ZOOM LENS

BACKGROUND

1. Technical Field

The present disclosure relates to image capture and, particularly, to a compact zoom lens.

2. Description of Related Art

Zoom lenses generally include a first lens, a first lens barrel housing the first lens, and a guide barrel housing the first lens barrel. The first lens is closest to the object side of the zoom lens and has the maximum diameter of all lenses employed in the zoom lens to determine the maximum luminous flux of the zoom lens. The guide barrel which receives the first lens barrel increases the diameter of the zoom lens, resulting in a bulk zoom lens.

Therefore, it is desirable to provide a compact zoom lens which can overcome the above-mentioned limitations.

BRIEF DESCRIPTION OF THE DRAWINGS

Many aspects of the present disclosure should be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail with reference to the drawings.

Figure 1:
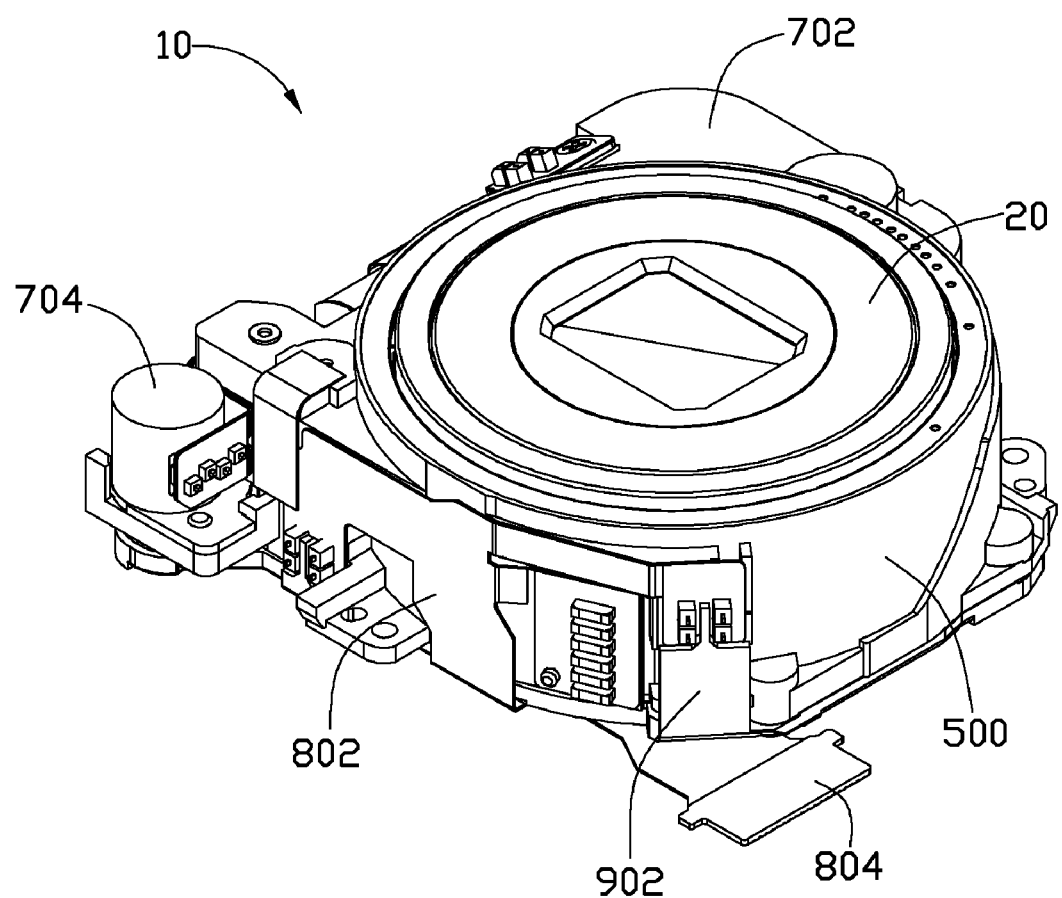
FIG. 1 is an isometric assembly view of a compact zoom lens, in accordance with an exemplary embodiment.
Figure 2:
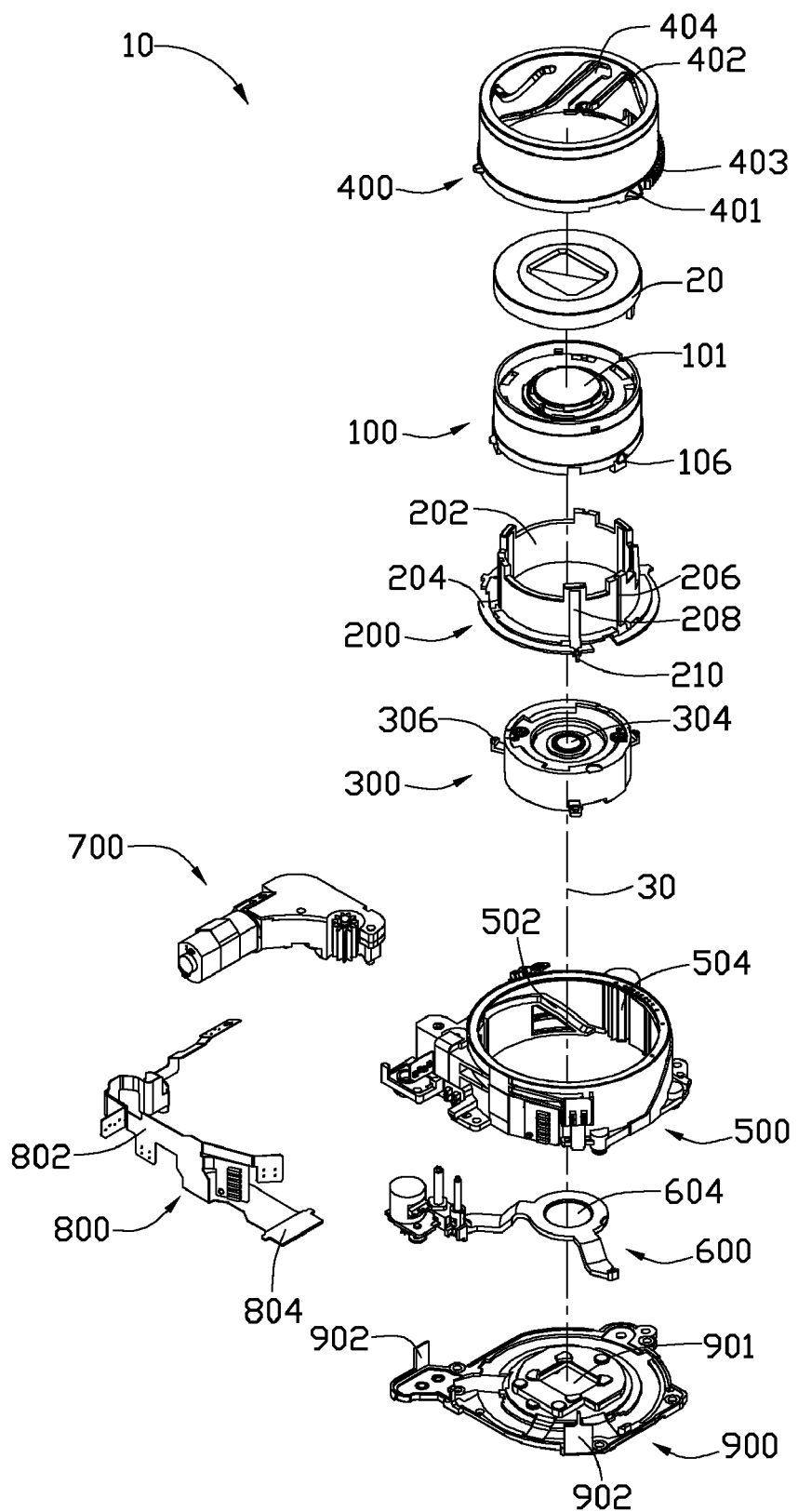
FIG. 2 is an exploded view of the zoom lens of FIG. 1.

Referring to FIGS. 1 and 2, a compact zoom lens 10, according to an exemplary embodiment, includes a shutter assembly 20, a first lens barrel 100, a first lens 101, a guide barrel 200, a second lens barrel 300, a second lens 304, a cam barrel 400, a fixed barrel 500, a lens seating 600, a third lens 604, a driving device 700, a flexible printed circuit (FPC) 800, and a base 900. The zoom lens 10 defines an optical axis 30.

The first lens barrel 100 is substantially tubular and houses the first lens 101. The first lens 101 is closest to the object side of the zoom lens 10 and has the maximum diameter of all lenses employed in the zoom lens 10. The first lens barrel 100 is provided with three first sliding pins 106 protruding from the outside wall thereof and arranged at regular angular intervals, close to the image side of the zoom lens 10. The first lens barrel 100 also includes three protruding posts 105 (shown in FIG. 4) protruding from the inside wall thereof along the direction of the optical axis 30 and arranged at regular angular intervals.

The guide barrel 200 includes a tubular barrel body 202 and a flange 204 extending outward from an end of the barrel body 202 close to the image side of the zoom lens 10. The barrel body 202 defines three first guide slots 206 on the outside wall thereof along the direction of the optical axis 30, arranged at regular angular intervals. The barrel body 202 is also provided with three rectangular guide holes 208 equidistantly arranged on the outside wall thereof, along the direction of the optical axis 30. Each of the three first guide slots 206 is sandwiched between two guide holes 208. Three second sliding pins 210 protrudes equidistantly from flange 204 on the edge thereof. The outer diameter of the barrel body 202 is less than the inner diameter of the first lens barrel 100. The first guide slots 206 receive the respective protruding posts 105 to move therein along the optical axis 30.

The second lens barrel 300 is substantially tubular and houses the second lens 304. The second lens barrel 300 includes three third sliding pins 306 protruding from the outside wall thereof and arranged at regular angular intervals, close to the image side of the zoom lens 10. The third sliding pin 306 corresponds to the guide hole 208 of the guide barrel 200, and can move therein along the optical axis 30. The outer diameter of the second lens barrel 300 is less than the inner diameter of the barrel body 202.

Figure 3:
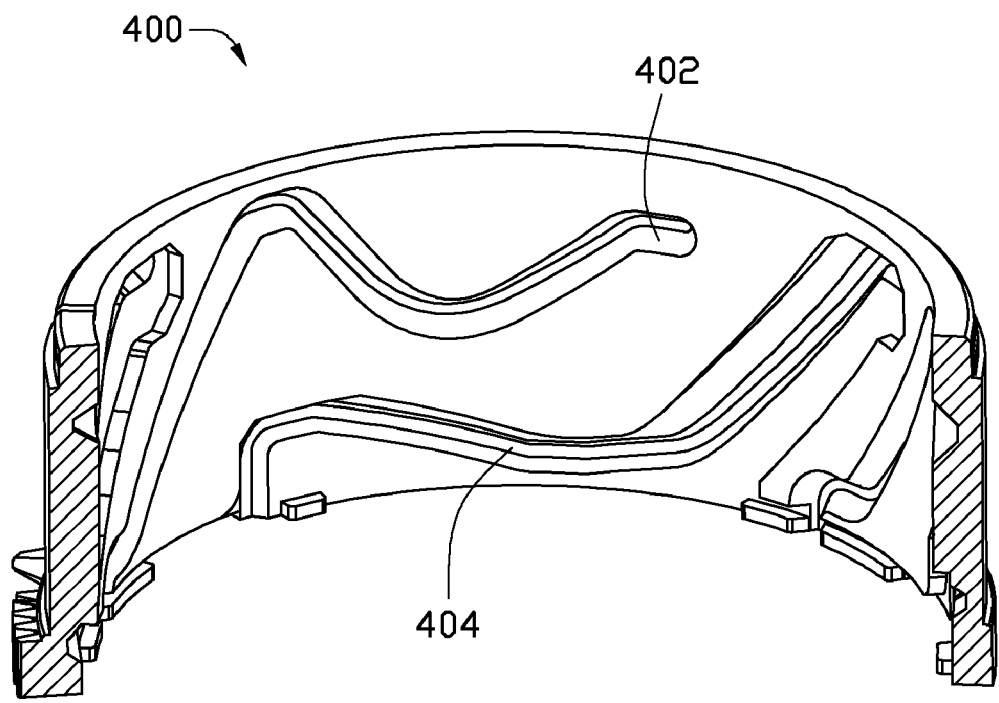
FIG. 3 is a cut-away view of the cam barrel of FIG. 1.

Also referring to FIG. 3, the cam barrel 400 is substantially tubular and defines three fourth sliding pins 401, a set of gears 403, three second guide slots 402, and three third guide slots 404. The three fourth sliding pins 401 equidistantly protrude outwards from an end of the outer wall of the cam barrel 400 close to the image side of the zoom lens 10. The gears 403 are arranged between two fourth sliding pins 401. The three second guide slots 402 are equidistantly arranged on the inside wall of the cam barrel 400. Each of the three second guide slots 402 is angled relative to the optical axis 30 and configured for receiving a corresponding first sliding pin 106 and guiding the first sliding pin 106 to move therein. As such, a movement of the first lens barrel 100 on the optical axis 30 is generated. The three third guide slots 404 are equidistantly arranged on the inside wall of the cam barrel 400. Each of the three third guide slots 404 is angled relative to the optical axis 30 and the second guide slot 402, and configured for receiving a corresponding third sliding pin 306 and guiding the third sliding pin 306 to move therein, thereby generating a relative movement of the second lens barrel 300 and the first lens barrel 100. Each of the three third guide slots 404 is sandwiched between two second guide slots 402. The inner diameter of the cam barrel 400 exceeds the outer diameter of the first lens barrel 100.

Figure 4:
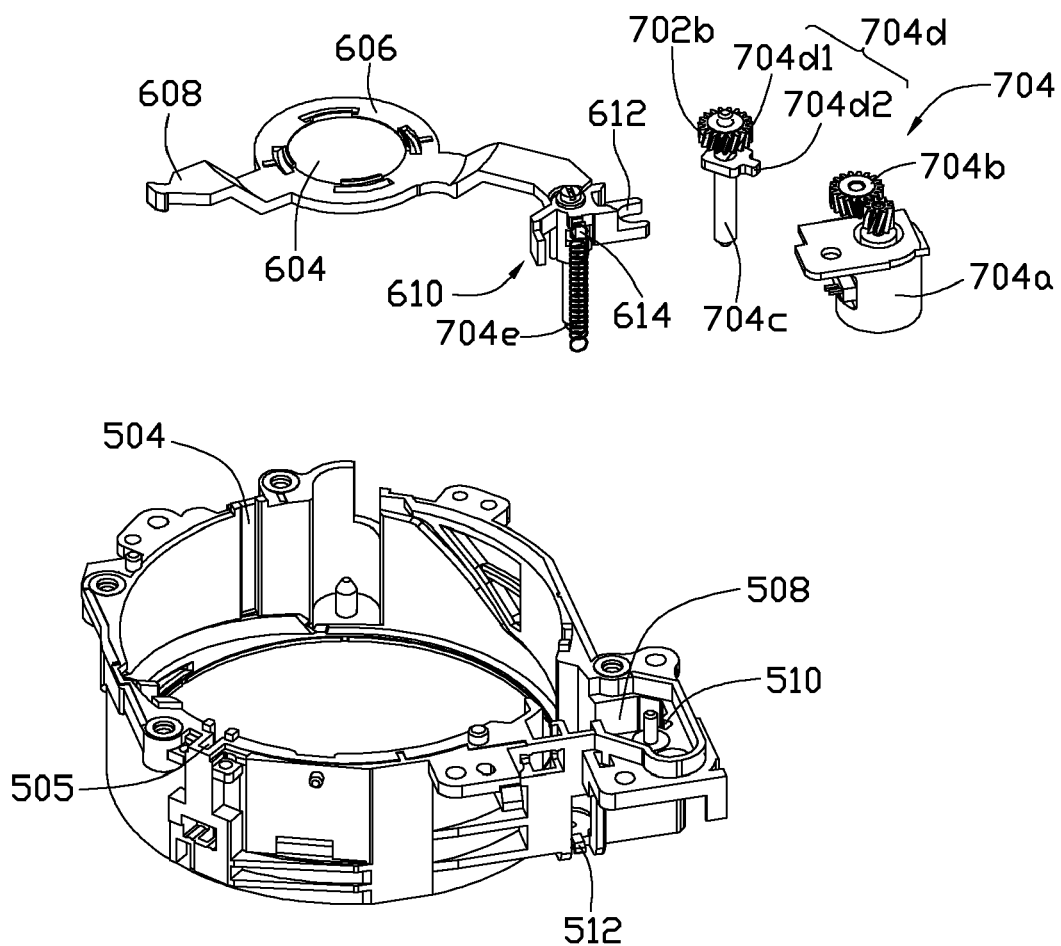
FIG. 4 is an exploded view of a fixed barrel, a lens seating, and a driving device of the zoom lens of FIG. 1.
Figure 5:
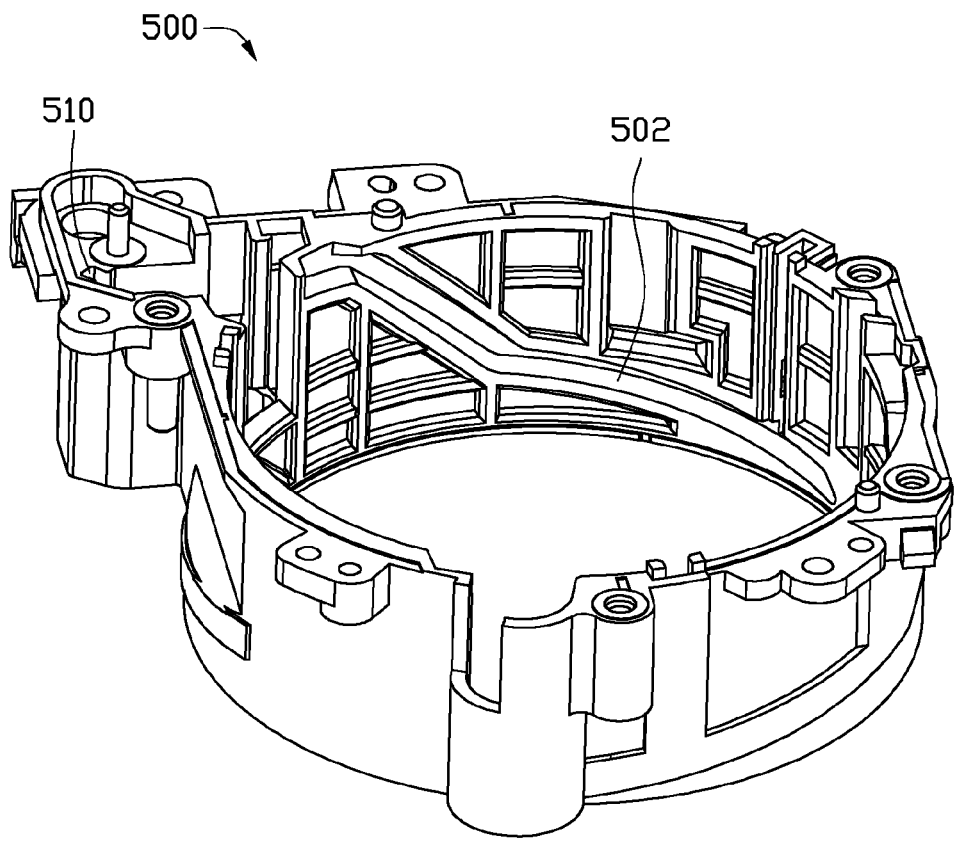
FIG. 5 shows the fixed barrel of the zoom lens of FIG. 1 viewed from another angle.

Also referring to FIGS. 2, 4 and 5, the fixed barrel 500 is substantially tubular, and defines three fourth guide slots 502, three fifth guide slots 504, a sixth guide slot 505 on the inner side wall thereof, and a receiving groove 508 on a surface (not labeled) thereof facing the base 900. Each of the three fourth guide slots 502 is angled relative to the optical axis 30 and configured for receiving and guiding a corresponding fourth sliding pin 401. Each of the three fifth guide slots 504 is substantially parallel to the direction of the optical axis 30 and configured for receiving a corresponding second sliding pin 210 and guiding the guide barrel 200 to move along the optical axis 30. Each of the three fifth guide slot 504 is sandwiched between two fourth guide slots 502. The sixth guide slot 505 is arranged along the direction of the optical axis 30. The receiving groove 508 defines a seventh guide slot 510 on a side wall thereof substantially parallel to the direction of the optical axis 30 and a first hook 512 on the bottom surface thereof. The inner diameter of the fixed barrel 500 exceeds the outer diameter of the cam barrel 400.

The lens seating 600 includes a ring 606, a first terminal 608, and a second terminal 610. The first terminal 608 and the second terminal 610 extend from two opposing sides of the ring 606. The second terminal 610 defines a U-shaped slot 612 and a second hook 614 beside the U-shaped slot 612. The third lens 604 is received in the ring 606.

Figure 6:
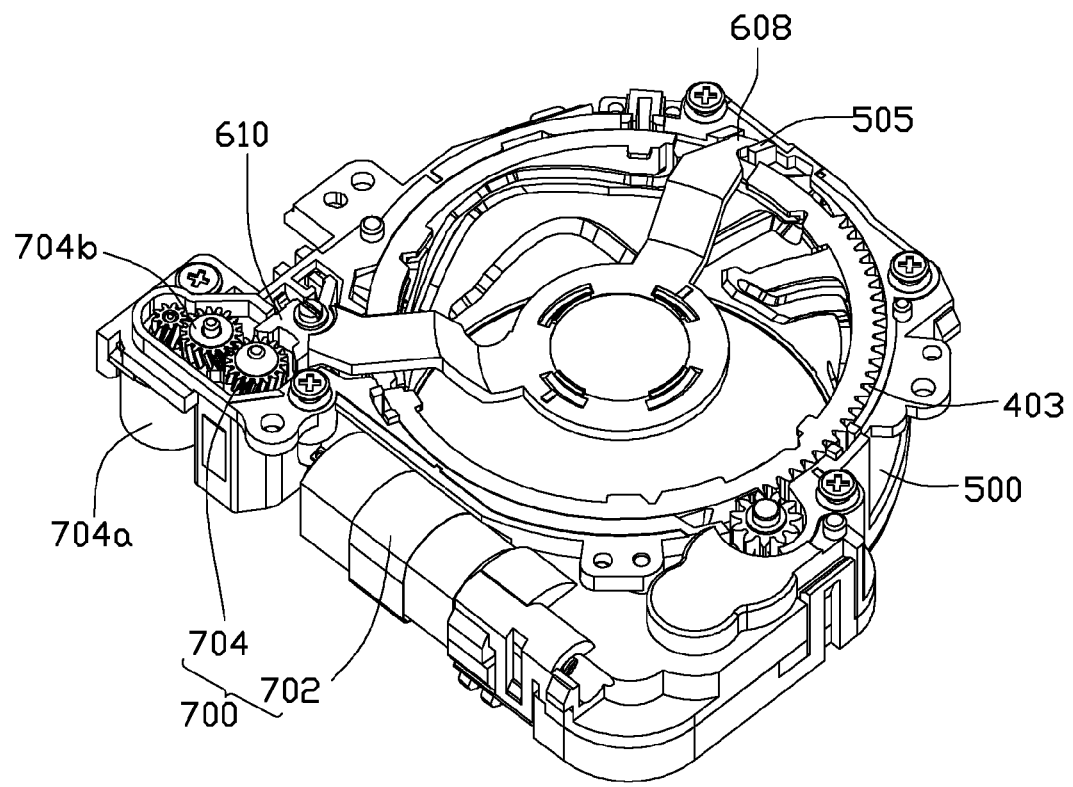
FIG. 6 shows a first lens barrel, a cam barrel, the fixed barrel, the lens seating, and the driving device of the zoom lens of FIG. 1.
Figure 6:
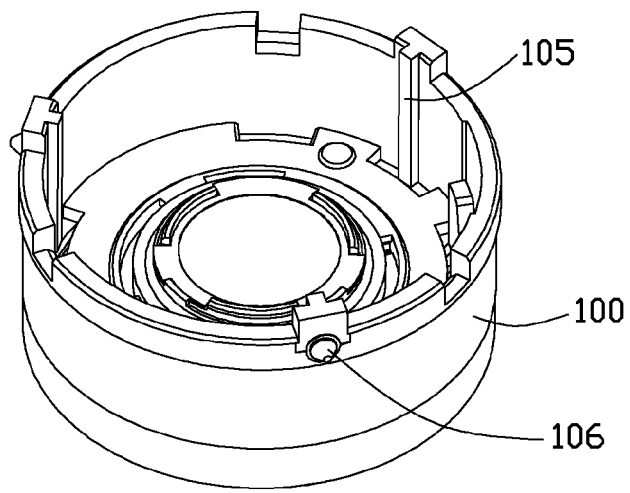

Also referring to FIG. 6, the driving device 700 includes a first driving module 702 and a second driving module 704. The first driving module 702 is configured to couple with the gears 403 of the cam barrel 400 and rotate the cam barrel 400 when the zoom lens 10 is zooming. The second driving module 704 includes a driving body 704a, a first wheel 702b, two second wheels 704b, a substantially cylindrical threaded post 704c, a guide plate 704d, and a spring 704e. The guide plate 704d defines a threaded hole 704d1 therethrough corresponding to the threaded post 704c and a protrusion 704d2 protruding from a side thereof. The threaded post 704c screws into the threaded hole 704d1 and an end thereof is fixed to the first wheel 702b. The threaded post 704c is arranged along the direction of the optical axis 30. The driving body 704a is connected to a second wheel 704b, configured to rotate the first wheel 702b and the threaded post 704c through the other second wheel 704b.

The FPC 800 includes a main circuit 802 and a connection port 804 connected to the main circuit 802. The base 900 defines a through hole 901 on the optical axis 30 and two pressing plates 902 at an edge thereof, protruding towards the fixed barrel 500.

In assembling, the shutter assembly 20 is arranged on a distal end of the first lens barrel 100, close to an object side of the zoom lens 10. The guide barrel 200 is housed in the first lens barrel 100, with the protruding posts 105 of the first lens barrel 100 received in the first guide slots 206 and the first lens barrel 100 held on the flange 204. The second lens barrel 300 is housed in the guide barrel 200, with the third sliding pins 306 extending out of the guide barrel 200 and the first lens barrel 100 via the corresponding guide holes 208. The first lens barrel 100 is housed in the cam barrel 400, while the first sliding pins 106 are received in the second guide slots 402, the second sliding pins 306 are received in the third guide slots 404, and the cam barrel 400 is held on the flange 204. The cam barrel 400 is housed in the fixed barrel 500. Meanwhile, the fourth sliding pins 401 are received in the fourth guide slots 502 and the second sliding pins 210 are received in the firth guide slots 504.

The first driving module 702 is fixed to the fixed barrel 500, coupling with the gears 403 of the cam barrel 400. The second driving module 704 is received in the receiving groove 508 with the protrusion 704d2 received in the seventh guide slot 510. The first terminal 608 of the lens seating 600 is received in the sixth guide slot 505 while the second terminal 610 is received in the receiving groove 508. The U-shaped slot 612 surrounds the threaded post 704c and is sandwiched between the guide plate 704d and the first wheel 702b. The spring 704e is connected to the first hook 512 and the second hook 614 and at a stretched state, thereby the second terminal 610 of the lens seating 600 is attached to the guide plate 704d. The main circuit 802 surrounds the fixed barrel 500, connecting the first driving module 702, the driving body 704a, and the shutter assembly 20 to the connection port 804. The base 900 is fixed to the fixed barrel 500, sandwiching the lens seating 600 therebetween. Meanwhile, the two pressing plates 902 cooperatively press the main circuit 802 onto the outer wall of the fixed barrel 500, such that the FPC 800 is fixed to the fixed barrel 500.

As such, the guide barrel 200 is used to guide the first lens barrel 100 and the second lens barrel 300 to move along the optical axis 30. The cam barrel 400 is configured to move the first lens barrel 100 and the second lens barrel 300 relative to each other along the optical axis when being rotated to change the focal length of the zoom lens. The fixed barrel 500 is configured to guide the guide barrel 200 to move along the optical axis 30 and define a rotating track (the three fourth guide slots 502) of the cam barrel 400. The driving device 700 rotates the cam barrel 400 and moves the lens seating 600 along the optical axis 30.

In operation, when the zoom lens 10 is at a zooming state, the first driving module 702 rotates the cam barrel 400 along the fourth guide slot 502 in the fixed barrel 500. While the guide barrel 200 moves only along the optical axis 30 under the guiding of the fifth guide slot 504. Guided by the first guide slot 206 and the second guide slots 402, the first lens barrel 100 moves along the optical axis 30. Restricted by the guide hole 208 and the third guide slot 404, the second lens barrel 300 also moves along the optical axis 30. Therefore, the first lens barrel 100 and the second lens barrel 300 move relative to each other along the optical axis 30. When the zoom lens 10 is at a focusing state, the driving body 704a rotates the threaded post 704c through the first and second wheels 702b, 704b. Coupling with the threaded post 704c and restricted by the seventh guide slot 510 along the direction parallel to the optical axis 30, the guide plate 704d moves along the seventh guide slot 510. Such that the lens seating 600 moves along the optical axis 30.

In the present disclosure, the guide barrel 200 is received in the first lens barrel 100. Compared to the guide barrel 200 being disposed out of the first lens barrel 100, the outer diameter of the zoom lens 10 is reduced by twice the thickness of the wall of the guide barrel 200. As such, the zoom lens 10 is compact. In another aspect, the two pressing plates 902 fix the main circuit 802 to the fixed barrel 500, whereby the main circuit 802 is not required to be fixed to the fixed barrel 500 by further procedure but just assembling the base 900 to the fixed barrel 500, simplifying operation and assembly of the zoom lens 10.

In alternative embodiments, the number and position of the pressing plate 902 can vary according to actual need, and are not limited to the present embodiment.

It will be understood that the disclosed embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A zoom lens comprising:
   a first lens;
   a first lens barrel housing the first lens;
   a shutter assembly positioned on a distal end of the first lens barrel toward an object side of the zoom lens;
   a guide barrel received in the first lens barrel and configured for guiding the first lens barrel to move along the optical axis of the zoom lens;
   a second lens;
   a second lens barrel housing the second lens, wherein the first lens is positioned closer to the object side of the zoom lens than the second lens, the diameter of the first lens is greater than that of the second lens, the second lens barrel is received in the guide barrel and configured to be guided by the guide barrel to move along the optical axis of the zoom lens;
   a cam barrel receiving the first lens barrel and coupling with the first lens barrel and the second lens barrel, the cam barrel being configured to cause the first lens barrel and the second lens barrel to move relative to each other along the optical axis when being rotated to change the focal length of the zoom lens;
   a fixed barrel, wherein the fixed barrel defines a rotating track of the cam barrel, the cam barrel is received in the fixed barrel and capable of rotating along the rotating track to move along the optical axis of the zoom lens;
a lens seating;
a third lens fixed on the lens seating, wherein the lens seating is received in the fixed barrel;
a driving device fixed to the fixed barrel and configured to rotate the cam barrel along the rotating track and move the lens seating along the optical axis; and
a base fixed to a distal end of the fixed barrel that is close to an image side of the zoom lens;
wherein the guide barrel comprises a barrel body, the first lens barrel, the barrel body, the second lens barrel, the cam barrel and the fixed barrel are all substantially tubular; the outer diameter of the second lens barrel is less than the inner diameter of the barrel body, the outer diameter of the barrel body is less than the inner diameter of the first lens barrel, the outer diameter of the first lens barrel is less than the inner diameter of the cam barrel, the outer diameter of the cam barrel is less than the inner diameter of the fixed barrel;
wherein the guide barrel further comprises a flange extending outwards from an end of the barrel body that is close to the image side of the zoom lens, the flange comprises three first sliding pins protruding equidistantly from the edge thereof; the fixed barrel comprises three first guide slots defined on the inner side wall thereof, substantially parallel to the direction of the optical axis; each first sliding pin of the guide barrel is received in a corresponding one of the first guide slots.

2. The zoom lens of claim 1, wherein the cam barrel comprises a plurality of gears at an end of the outer wall thereof that is close to the image side of the zoom lens;
the driving device comprises a first driving module fixed to the fixed barrel and couple with the gears.

3. The zoom lens of claim 1, wherein the fixed barrel further defines a second guide slot on the inner side wall thereof and a receiving groove on a surface thereof that is close to the image side of the zoom lens, the second guide slot is arranged along the direction of the optical axis; the lens seating comprises a ring engaging with the third lens, a first terminal, and a second terminal, the first terminal and the second terminal extend from two opposing ends of the ring; the first terminal of the lens seating is received in the second guide slot while the second terminal of the lens seating is received in the receiving groove.

4. The zoom lens of claim 3, wherein the receiving groove comprises a third guide slot on a side wall thereof, parallel to the direction of the optical axis, and a first hook on the bottom surface thereof; the second terminal defines a U-shaped slot and a second hook beside the U-shaped slot; the driving device comprises a second driving module received in the receiving groove, the second driving module comprises a driving body, a first wheel, two second wheels, a substantially cylindrical threaded post, a guide plate, and a spring; the guide plate defines a threaded hole therethrough corresponding to the threaded post and a protrusion protruding from a side thereof; the threaded post is arranged along the direction of the optical axis and screws into the threaded hole, an end of the threaded post is fixed to the first wheel; the driving body is connected to one of the second wheels and is capable of rotating the first wheel and the threaded post through the other of the second wheels; the protrusion is received in the third guide slot, the U-shaped slot surrounds the threaded post and is sandwiched between the guide plate and the first wheel; the spring is connected to the first hook and the second hook and at a stretched state.

5. The zoom lens of claim 1, wherein the zoom lens further comprises a flexible printed circuit, the flexible printed circuit comprises a main circuit and a connection port; the main circuit surrounds the fixed barrel and connects the driving device and the shutter assembly to the connection port.

6. The zoom lens of claim 5, wherein the base comprises at least one pressing plate at a edge thereof, protruding toward the fixed barrel, the at least one pressing plate press the main circuit onto the outer wall of the fixed barrel.

7. The zoom lens of claim 1, wherein the first lens barrel comprises three protruding posts protruding from the inside wall thereof along the direction of the optical axis and arranged at regular angular intervals; the barrel body comprises three fourth guide slots on the outside wall thereof along the direction of the optical axis, arranged at regular angular intervals; the protruding posts of the first lens barrel are received in the fourth guide slots of the barrel body correspondingly.

8. The zoom lens of claim 1, wherein the second lens barrel comprises three second sliding pins protruding from the outside wall thereof and arranged at regular angular intervals; the barrel body comprises three guide holes equidistantly arranged on the outside wall thereof, arranged along the direction of the optical axis, each of the three fourth guide slot is sandwiched between two guide holes; the second sliding pins extend out of the barrel body via the guide holes correspondingly.

9. The zoom lens of claim 8, wherein the first lens barrel comprises three third sliding pins protruding from the outside wall thereof and arranged at regular angular intervals; the cam barrel comprises three fifth guide slots and three sixth guide slots, the three fifth guide slots are angled relative to the optical axis and arranged at regular angular intervals on the inside wall of the cam barrel, the three sixth guide slots are angled relative to the optical axis and the fifth guide slots and equidistantly arranged on the inside wall of the cam barrel, each of the three sixth guide slots is sandwiched between two fifth guide slots; each third sliding pin of the first lens barrel is received in a corresponding one of the fifth guide slots, each second sliding pin of the second lens barrel is received in a corresponding one of the sixth guide slots.

10. The zoom lens of claim 1, wherein the cam barrel comprises three fourth sliding pins protruding outwards from an end of the outer wall thereof that is close to the image side of the zoom lens and are equidistantly arranged; the rotating track of the fixed barrel comprises three seventh guide slots on the inner side wall thereof, angled relative to the optical axis;
each of the three seventh guide slots is sandwiched between two sixth guide slots; each fourth sliding pin of the cam barrel is received in a corresponding one of the seventh guide slots.

* * * * *